United States Patent

[11] 3,628,753

[72] Inventors Gordon E. Bradt
Wilmette;
Richard Frystak, Park Ridge; Nicholas Mischenko, Chicago; Edward R. Prelletz, Chicago, all of Ill.

[21] Appl. No. 826,045
[22] Filed Apr. 21, 1969
[45] Patented Dec. 21, 1971
[73] Assignee Bell & Howell Company
Chicago, Ill.

[54] FILM CARTRIDGE
35 Claims, 18 Drawing Figs.

[52] U.S. Cl. 242/197, 352/73
[51] Int. Cl. G03b 1/04, G11b 15/32, G11b 23/04
[50] Field of Search 242/186, 194–198, 71.2, 75.51; 356/106–109; 352/72–78; 33/46, 67

[56] References Cited

UNITED STATES PATENTS

| | | | |
|---|---|---|---|
| 2,926,860 | 3/1960 | Pomarico | 242/186 |
| 3,017,801 | 1/1962 | Ingber | 356/160 |
| 3,488,016 | 1/1970 | Mouissie | 242/197 |
| 3,502,283 | 3/1970 | Gross | 242/197 |

*Primary Examiner*—Leonard D. Christian
*Attorneys*—Hume, Clement, Hume & Lee and William F. Pinsak

ABSTRACT: A cartridge for a strip of flexible material, preferably film, adapted for use with a projector having automatic feed-out means, basically comprising a reel receptacle and a cover. The receptacle has a flat back portion and a circular reel spacer ridge on the back portion. An arcuate guide member is spaced from the back portion and positioned to penetrate the space between the flanges of a reel in the receptacle along an upper portion of the reel. The cover fits over the receptacle to substantially enclose a reel, and has an internal reel spacer ridge and a central, internal reel-bearing projection located to penetrate the central opening in the hub of a reel positioned in the receptacle. The receptacle and cover are constructed and arranged to form a threading aperture on the bottom end of the assembled cartridge to permit a strip of flexible material to be drawn from the reel out of the cartridge.

The invention also provides a method and means for estimating the number of feet of film on a reel. In carrying out the method, a beam of light is projected between the flanges of the reel in a manner so that the beam is at least partially masked by the film on the reel. The light beam is collected as a collection surface, and the amount of film on the reel is estimated by reading a scale on the collection surface.

INVENTORS.
EDWARD R. PRELLETZ
RICHARD FRYSTAK
NICHOLAS MISCHENKO
GORDON E. BRADT

BY Hume, Clement, Hume & Lee
Attorneys.

FILM CARTRIDGE

The present invention relates to an improved cartridge for a strip of flexible material on a reel, and more specifically to an improved cartridge adapted for use in conjunction with an automatic feed-out apparatus.

Generally, the present invention relates to an improved cartridge for a strip of flexible material (sometimes referred to as a "web") on a reel, and comprises basically a reel receptacle and a cover. The reel receptacle has a flat back portion and a circular reel spacer ridge on the back portion, which keeps a reel inserted into the receptacle from being in direct contact with the entire back portion. An arcuate guide member is mounted on and spaced from the back portion and positioned to penetrate the space between the flanges of a reel along a portion of the reel when it is positioned in the receptacle. The cover is adapted to fit over the reel receptacle, and to substantially enclose a reel in the receptacle. The cover has an internal reel spacer ridge and a central, internal reel-bearing projection which is located to penetrate the central opening in the hub of a reel positioned in the receptacle. The reel receptacle and the cover are constructed and arranged in a manner to form a threading aperture on the bottom end of the assembled cartridge to permit a strip of flexible material to be drawn from the reel out of the cartridge.

The invention also provides a method for estimating the amount of material on a reel by projecting a light beam in a manner so that it is at least partially interrupted or masked according to the amount of material on the reel. The beam is collected on a collection surface, and the surface is read to provide an estimate of the amount of material remaining on the reel. The cartridge of the present invention may also be modified to include a scale positioned for illumination by a beam of light from an external source passing upwardly through the cartridge and between the flanges of a reel in the cartridge. The external light source is positioned so that the passage of the light beam is at least partially masked by material on the reel before the light strikes the scale.

The invention, its construction and method of operation, together with the preferred embodiments thereof, will be best understood by reference to the following detailed description, taken together with the drawings, in which.

As previously mentioned, the cartridge of the present invention may be employed for a strip of flexible material on a reel. Thus, the cartridge of the present invention is adapted for use on both tape recorders and film projectors having automatic feed-out means. However, the preferred embodiments illustrated are primarily intended for use with a film projector having an automatic feed-out module, and therefore will be discussed herein in that context, it being understood that the invention is not limited to use with films.

Figures 6, 7, 8, 9, 10:
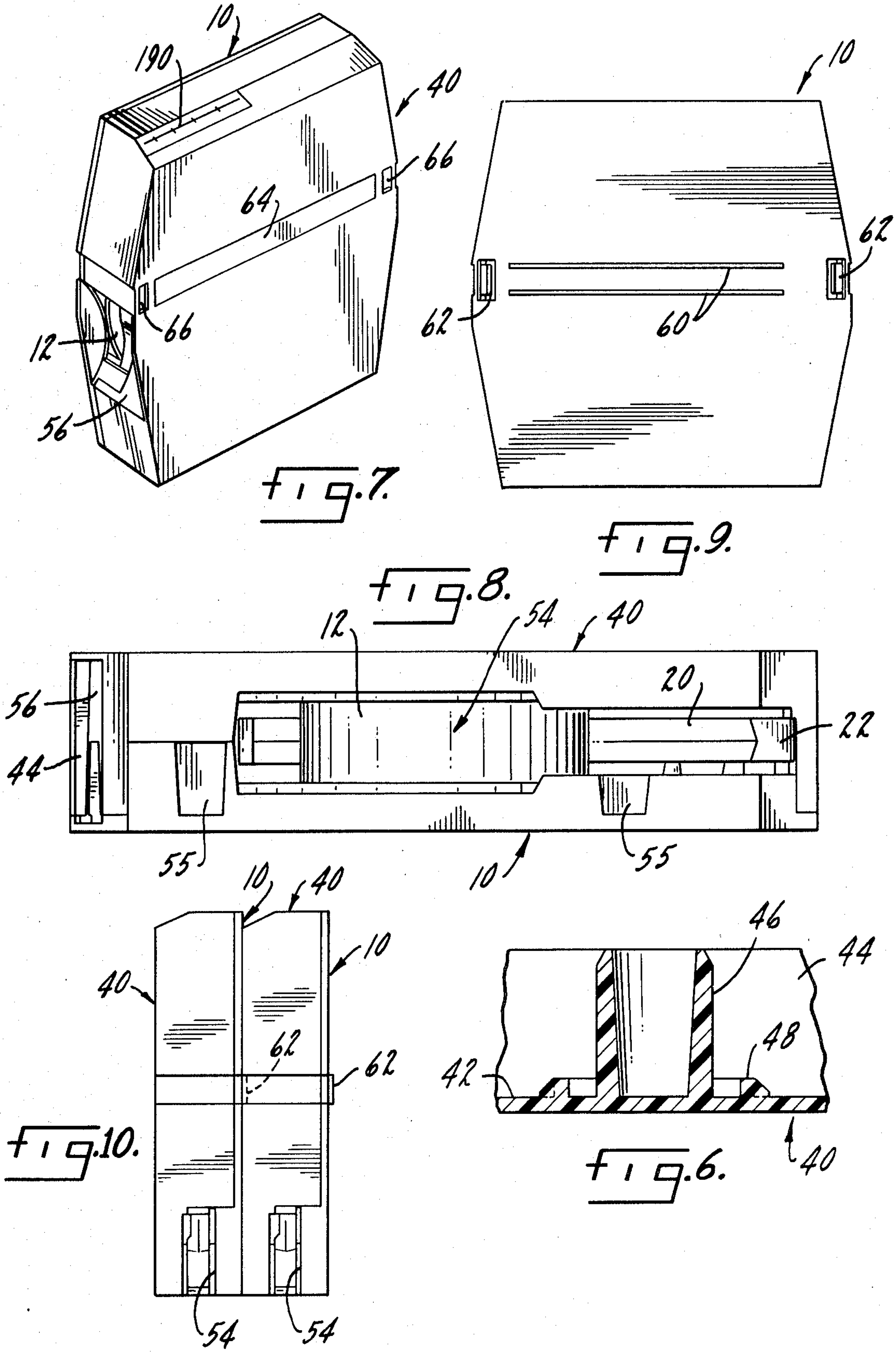
FIG. 6 is a cross-sectional view taken along line 6—6 of FIG. 1.
FIG. 7 is a perspective view of an assembled film cartridge constructed in accordance with the present invention.
FIG. 8 is a bottom view of the film cartridge of FIG. 7.
FIG. 9 is a back view of the film cartridge of FIG. 7.
FIG. 10 is a side view of a pair of film cartridges similar to those shown in FIGS. 7–9 in interlocked relationship.

The film cartridge of the present invention basically comprises a reel receptacle and a cover, shown in assembled relationship in FIG. 7. In the following detailed description of the invention, the cartridge will be discussed in the orientation shown in FIG. 7, which is the preferred orientation for delivery to an automatic feed-out module. However, it should be understood that references to the orientation of the cartridge, such as references to the "top" or "bottom" thereof, are used for convenience only, and to not mean that the operation or storage of the cartridge must be limited to that particular orientation.

Figure 1:
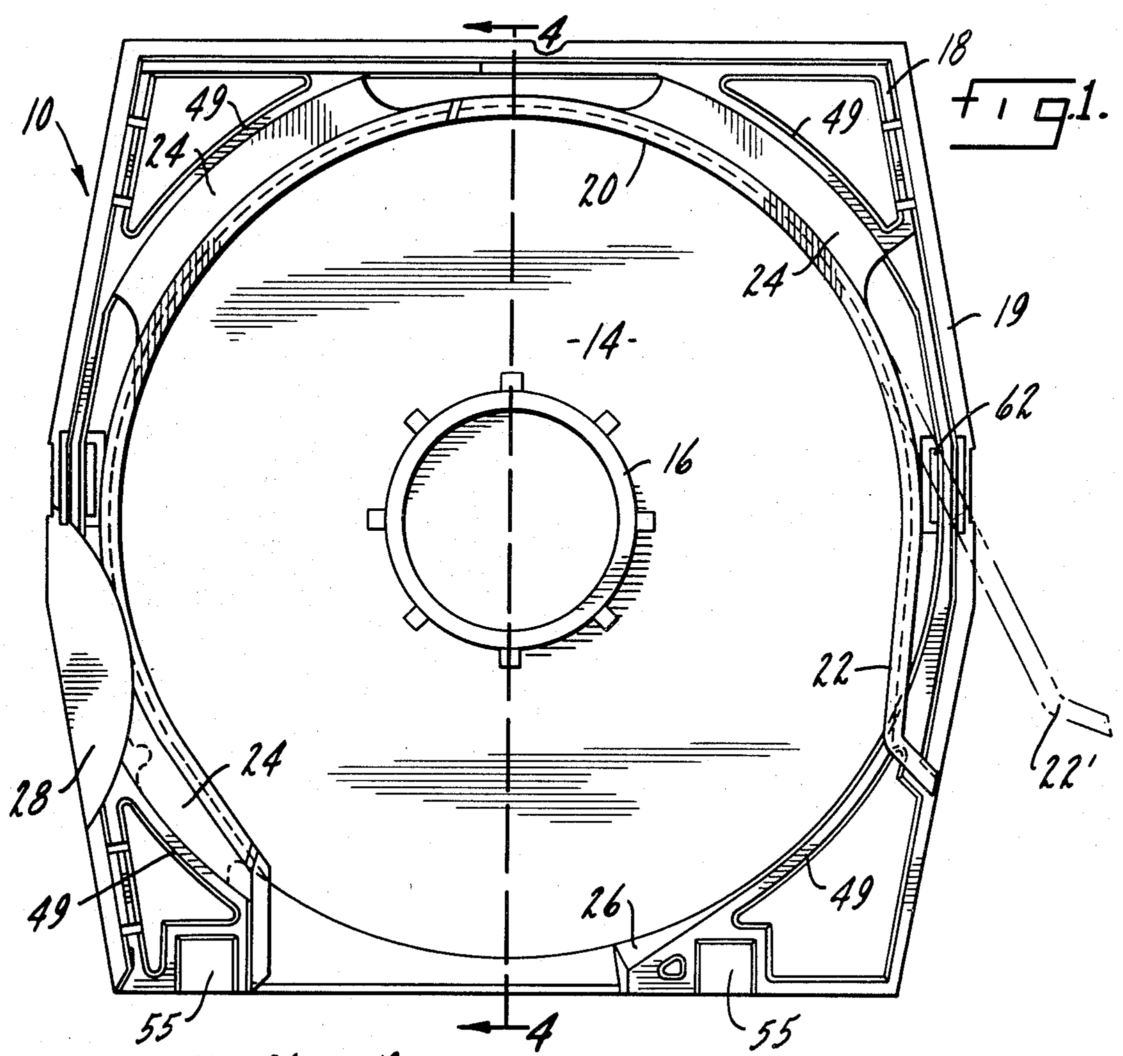
FIG. 1 is a front view of a reel receptacle constructed in accordance with the present invention.
Figure 2:
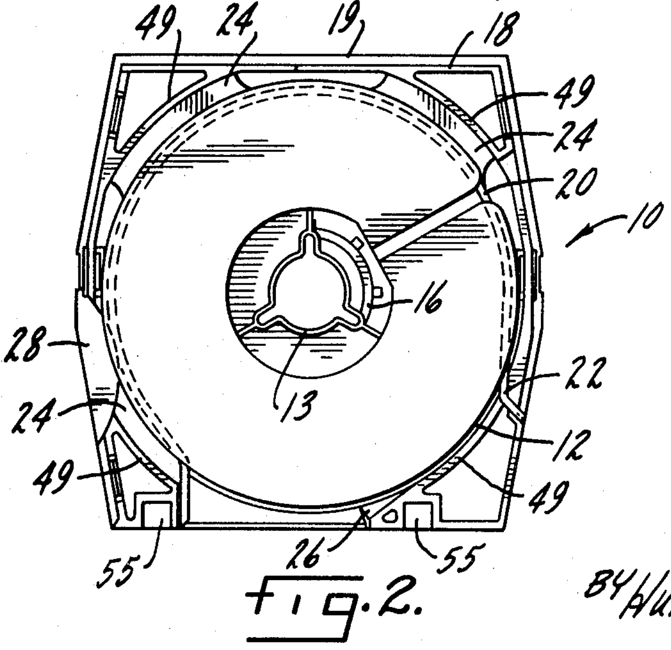
FIG. 2 is a front view of the receptacle of FIG. 1 with a reel inserted therein.
Figure 4:
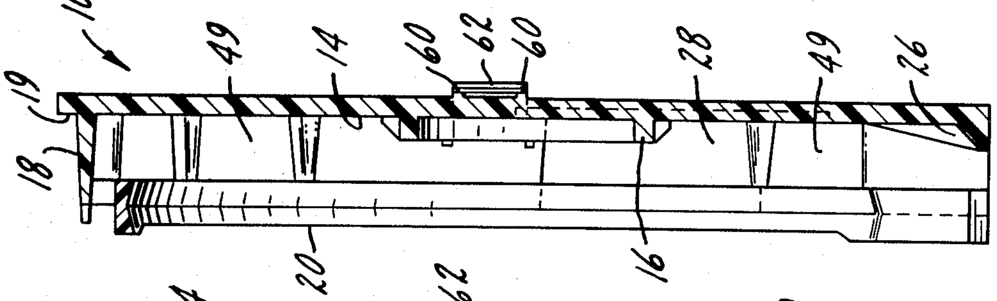
FIG. 4 is a cross-sectional view taken along line 4—4 of FIG. 1.

A reel receptacle constructed in accordance with the present invention is shown in FIG. 1, wherein it is generally designated by reference numeral 10. As shown in FIG. 2, the receptacle 10 is adapted to receive a conventional reel 12 having a central aperture 13 in the hub thereof. Referring to FIGS. 1–4, and more especially to FIG. 1, the reel receptacle 10 has a flat back portion 14 upon which a circular reel spacer ridge 16 is formed. As shown in FIG. 4, the reel spacer ridge 16 projects outwardly from the back portion 14 of the receptacle 10 only a small distance, and functions to maintain a reel in spaced relationship with the back portion 14.

As shown in FIGS. 1–4, the reel receptacle 10 has an outer wall 18 which is perpendicular to the flat back portion 14 and runs around a major portion of the perimeter of the reel receptacle 10. Portions of the outer wall 18 are slightly set in from the outer edge of the back portion 14 in order to form a flange 19 to facilitate mounting of the cover means, as will hereinafter appear.

Figure 3:
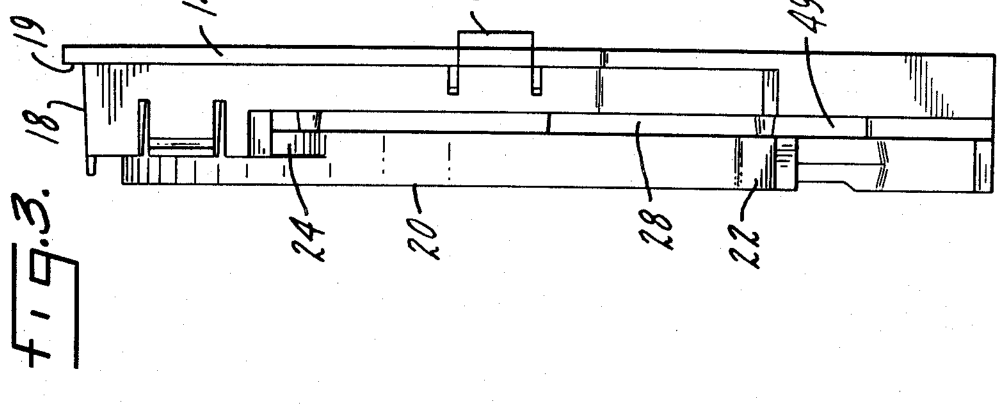
FIG. 3 is a right-hand side view of the reel receptacle shown in FIG. 1.

Referring to FIGS. 1, 3, and 4, an arcuate film guide member 20 is mounted in spaced relationship from the flat back portion 14 of the cartridge 10. The film guide member 20 is positioned to penetrate the space between the flanges of a reel 12, and has a flexible end portion 22 which is free to move outwardly to a second position 22′ to facilitate the insertion of a reel 12 into the receptacle 10. The film guide member 20, of course, does not completely surround the reel 12, since it must be open at the bottom to permit film to be withdrawn from the cartridge. Therefore, the film guide number 20 surrounds only an upper portion of the film in the reel 12. The arcuate film guide member 20 is preferably generally concentric with the reel spacer ridge 16, and is connected to the outer wall 18 by a plurality of connecting members 24. Of course, any mounting means may be employed, so long as they maintain the film guide member 20 in spaced relationship with the back portion 14, while permitting the guide member 20 to penetrate the space between flanges of a reel 12. As also shown in FIG. 1, the reel receptacle 10 has a film feedout guide 26, which insures that film will be fed out of the cartridge of the present invention in the proper direction for engagement with an automatic threading projector.

As shown most clearly in FIG. 4, the side of the reel receptacle 10 preferably has a rewind opening 28 in the outer wall 18, which permits a drive puck to contact the rim of a reel 12, as hereinafter described.

Figure 5:
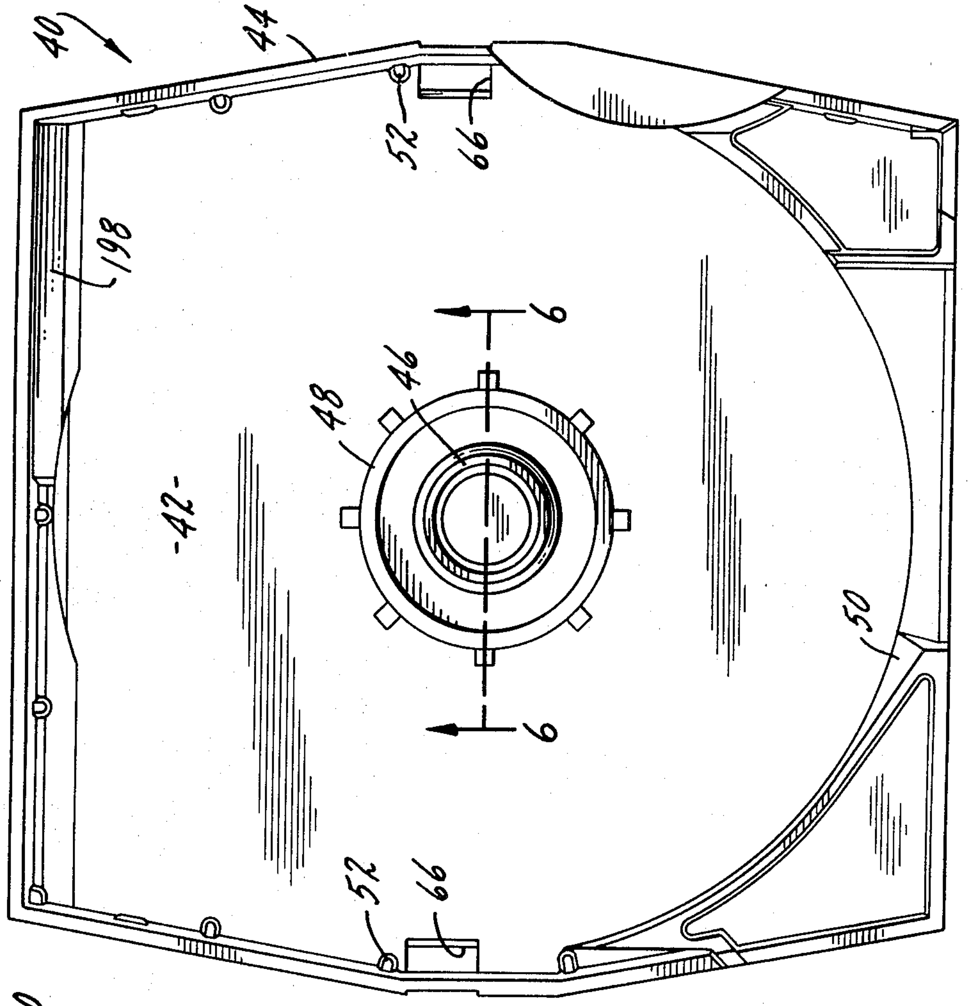
FIG. 5 is a rear view showing the inside of a cover adapted for use with the receptacle of FIGS. 1–4.

Referring to FIGS. 5 and 6, a cover for use with the receptacle 10 is generally designated by reference numeral 40. The cover 40 has a flat inside face portion 42 and an outer wall 44 which is generally perpendicular to the face portion 42. The outer wall 44 is positioned to fit over the outer wall 18 on the reel receptacle 10, to form a unitary cartridge as shown in FIG. 7. Referring to FIGS. 5 and 6, the cover 40 has a central, internal, generally cylindrical reel-bearing projection 46 which projects a distance about equal to the internal thickness of the fully assembled cartridge. In any event, it is necessary that the reel-bearing projection be located to penetrate the central opening in the hub of a reel 12 positioned within the reel receptacle 10. It is also important that the reel-bearing projection 46 be of a length sufficient to penetrate the central aperture 13 of the reel 12 a distance sufficient to form a bearing surface for rotation of the reel 12. The reel-bearing projection 46 is surrounded by a circular reel spacer ridge 48 which is preferably concentric with the reel-bearing projection 46. It is the function of the reel spacer ridge 48 to prevent the reel from contacting the flat face portion 42 of the cover 40, so that excessive friction is prevented while proper alignment is maintained. As with the reel receptacle 10, the cover 40 incorporates a film feed-out guide 50 which will be oppositely disposed from the film feed-out guide 26 in the receptacle 10 when the cartridge is assembled. These film feed-out guides 26, 50 both insure that the film is properly fed into the mechanism of an automatic threading projector.

As shown most clearly in FIGS. 1, 2 and 4, the cartridge receptacle 10 of the present invention has one or more reel positioner abutments 49, which contact the reel rim and aid in properly positioning the reel 12 when the cover 40 is placed on the receptacle 10. These positioner abutments 49 prevent excessive displacement of the reel 12, but do not contact the reel rim after the cover 40 has been put in place. After the cover 40 is in place, the reel is positioned by the reel-bearing projection 46.

As shown in FIG. 5, in the preferred embodiment, the cover 40 has a plurality of stop pins 52 which contact the outer wall 18 of the receptacle 10 to insure proper positioning of the cover 40 on the receptacle 10.

The fully assembled cartridge, comprising the receptacle 10 and cover 40 is shown in FIG. 7. When ready for use, the complete cartridge will also contain a reel 12 of film or the like. As shown in FIG. 8, when the reel receptacle and cover are assembled to form a cartridge, they are constructed and arranged in a manner to form a threading aperture 54 on the bottom of the cartridge, to permit a strip of film to be drawn from a reel 12 located within the cartridge. As shown in FIG. 8, the reel receptacle 10 is constructed to form a pair of mounting apertures 55 in the underside of the completed cartridge, these mounting apertures being positioned to engage positioning pins when the cartridge is mounted on a projector. In the preferred embodiment, as shown in FIG. 7, the receptacle 10 and cover 40 also form a rewind opening 56 on the side of the cartridge.

Referring to FIG. 9, the preferred embodiment of the present invention has a pair of horizontal, parallel ribs 60 which project rearwardly from the exterior of the reel receptacle 10. These ribs 60 perform the dual function of aiding in the proper vertical alignment of the cartridge in a projector, and also of aiding in properly aligning the cartridges when two or more cartridges are stacked, as hereinafter described. A pair of mounting tabs 62, which are also shown in FIGS. 3 and 4, project rearwardly from the exterior of the reel receptacle 10, and also aid in mounting the cartridge on a projector, and in interconnecting a plurality of cartridges.

Referring again to FIG. 7, in the most preferred embodiment, the exterior of the cover 40 has an elongated, horizontal indentation or groove 64 and a pair of apertures 66, which are positioned to receive the ribs 60 and mounting tabs 62, respectively, to permit a plurality of cartridges to be stacked, as shown in FIG. 10.

Figures 11, 12:
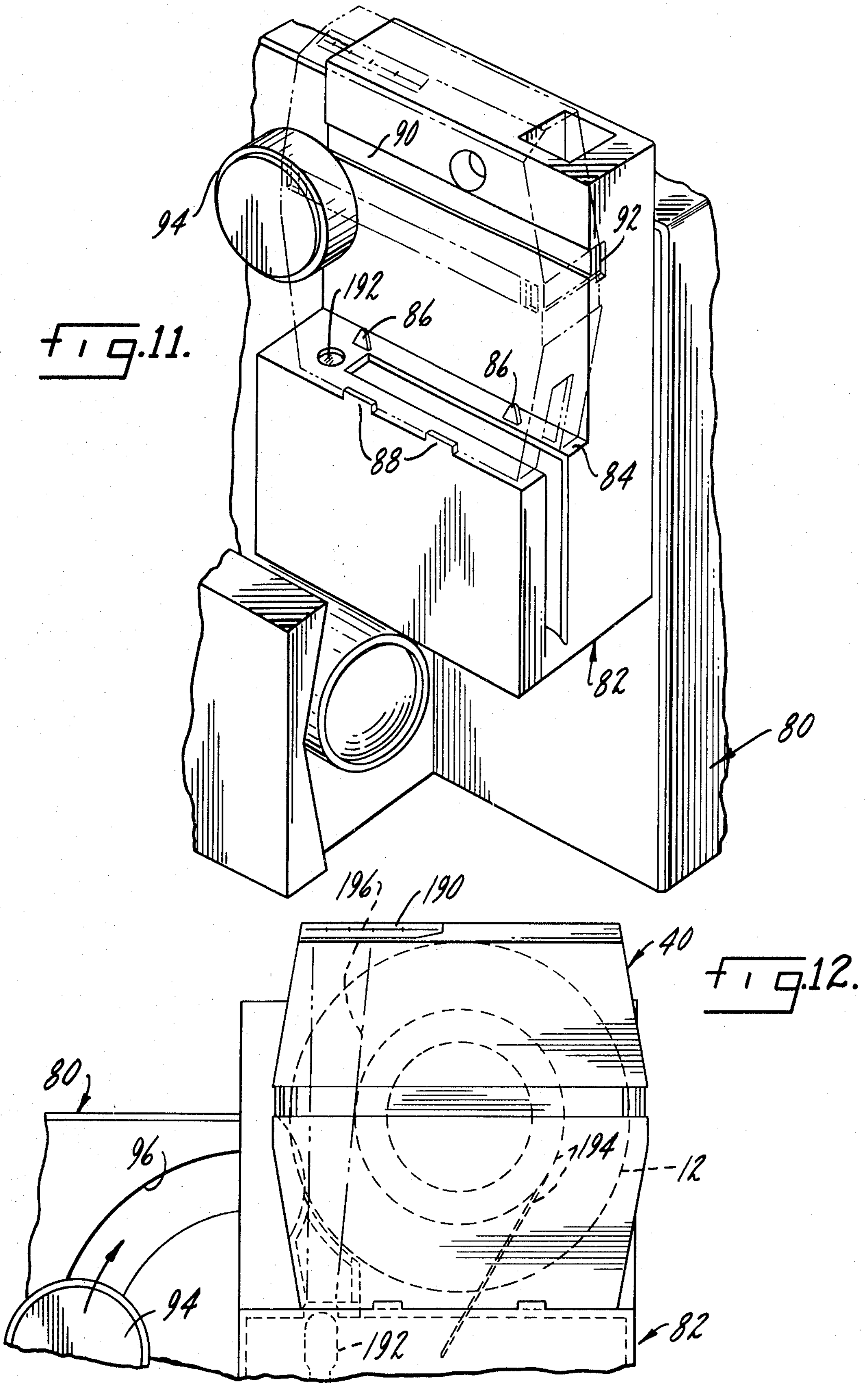
FIG. 11 is a fragmentary perspective view of a projector incorporating an automatic feed-out module adapted for use with the film cartridge of the present invention.
FIG. 12 is a front view of a cartridge constructed in accordance with the present invention, illustrating the use of the scale.

The manner in which the cartridge of the present invention mounts on a projector, generally 80, having an automatic feed-out module, generally 82, is illustrated in FIG. 11. A description of the automatic feed-out module 82 will be found in the copending application of Edward R. Prelletz et al., filed the same day as the present application and assigned to the assignee of the present application. Although the automatic feed-out module 82 does not form part of the present invention, a brief description will aid in the understanding of the manner in which the cartridge of the present invention cooperates with it. The feed-out module 82 has a horizontal cartridge seat 84 upon which the cartridge, shown by phantom lines, rests. The mounting apertures 55 on the end of the cartridge are engaged by a pair of locating pins 86, and the cartridge is also positioned by a pair of vertical abutments 88 on the edge of the seat 84. Finally, the cartridge is vertically positioned by a horizontal groove on the feed-out module 82, which receives the parallel ribs 60 on the back of the reel receptacle 10. Indentations 92 on the sides of the feed-out module 82 are positioned to receive the mounting tabs 62. Thus, the seat 84, the locating pins 86, the vertical abutments 88, the horizontal groove 90, and the indentations 92, which engaged the mounting tabs 62 all serve to properly position the cartridge on the automatic feed-out module. Of course, as is obvious from the drawing, proper positioning could also be obtained by the use of only one rib on the back of the cartridge, with a corresponding abutment on the automatic feed-out module 82. This is clear, since the only function of the ribs is to prevent the cartridge from being displaced in an upward direction when mounted on the projector, downward displacement being impossible because of the horizontal seat 84.

As shown in FIGS. 11 and 12, in the preferred embodiment a projector adapted for use in connection with the cartridge of the present invention is equipped with a drive puck 94, which is positioned in an arcuate channel 96 for movement to contact the rim of a reel 12 positioned in the cartridge of the present invention. The drive puck is shown in the rewind position in FIG. 11, as it would be employed for rewinding film or for reverse projection, and in the disengaged position for forward projection in FIG. 12. The drive puck 94 has a central wheel which is covered with a friction surface such as rubber.

The operation of the cartridge of the present invention, in the embodiment shown in FIGS. 1–12, is a very simple matter. The cartridge is first opened by removing the cover 40, and a reel 12 containing film is properly positioned in the cartridge as shown in FIG. 2. Proper positioning is facilitated by movement of the flexible end portion 22 of the arcuate film guide member 20 to the moved position 22' shown in FIG. 1. The reel 12 is then easily slipped into position, so that the film guide member 20 penetrates a short distance between the flanges of the reel 12. When properly positioned, the reel 12 will rest on the reel spacer ridge 16 of the reel receptacle 10.

After the reel 12 is properly positioned in the receptacle 10, the cover 40 is placed on the receptacle 10 as previously described. If the reel 12 is properly positioned in the receptacle 10, the reel-bearing projection 46 will easily penetrate the central opening 13 in the hub of the reel 12. Once the cartridge is assembled with the film inside, projection is a very simple matter. As shown in FIG. 11, the cartridge is simply positioned on a projector having an automatic feed-out module designed for use with this cartridge. The film will be fed from the cartridge into the projector by automatic stripper means (not shown), and may also be rewound back into the cartridge by use of the drive puck 94.

Figure 13:
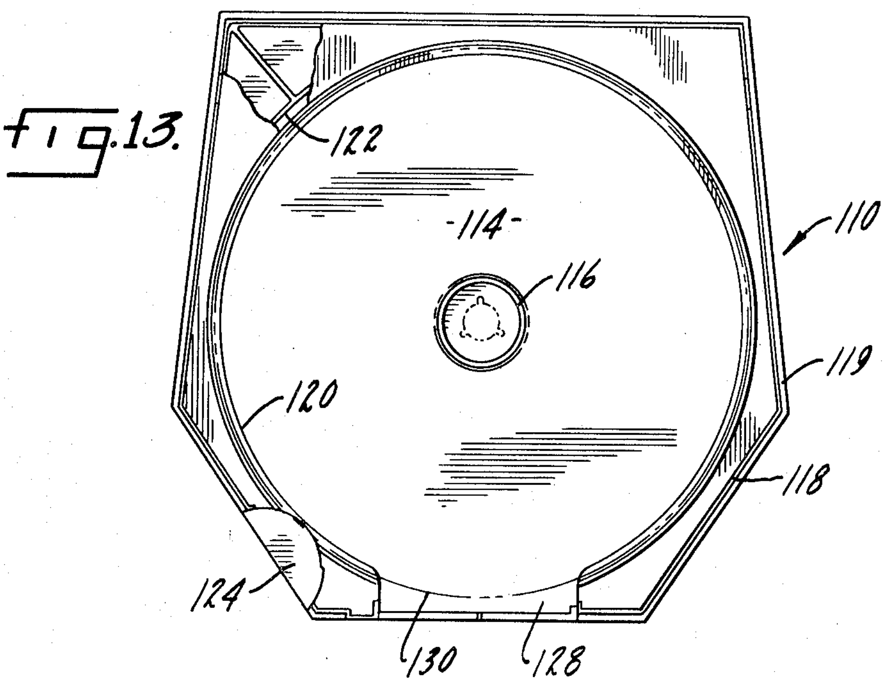
FIG. 13 is a front view of a reel receptacle illustrating a second embodiment of the present invention.
Figure 14:
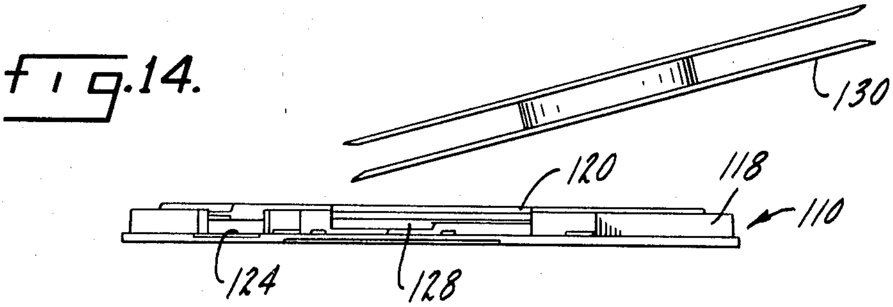
FIG. 14 is a bottom view of the reel receptacle shown in FIG. 13, illustrating the manner in which a reel is inserted.
Figure 15:
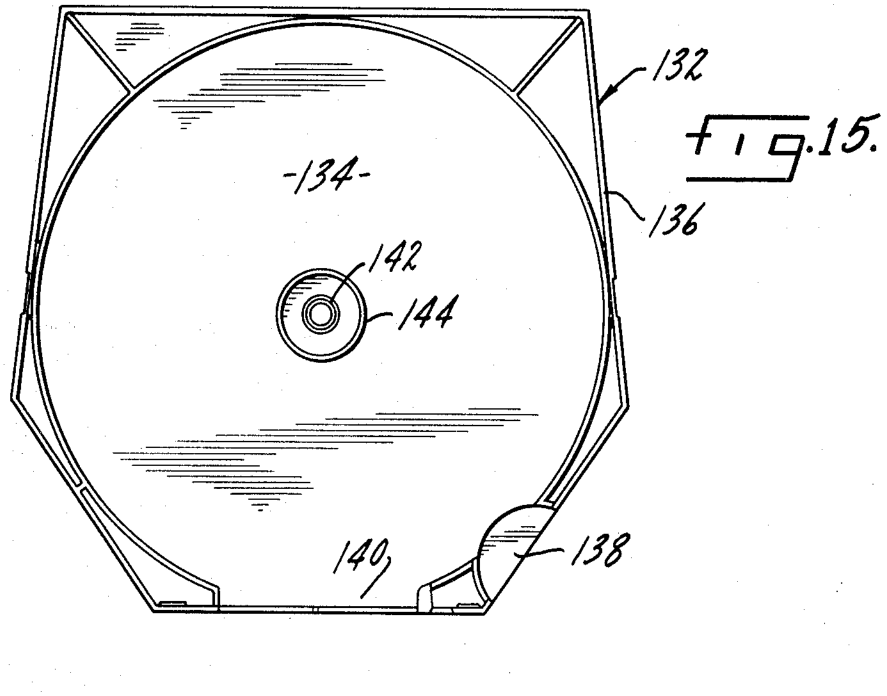
FIG. 15 is a rear view showing the inside of a cover adapted for use with the receptacle shown in FIGS. 13 and 14.

A second embodiment of the present invention, which employs a rigid film guide, rather than one having a flexible end portion, is shown in FIGS. 13–15. The reel receptacle of the second embodiment is generally designated by reference numeral 110. As with the first embodiment, the receptacle 110 has a flat back portion 114 and a central, circular reel spacer ridge 116. An outer wall 118 is generally perpendicular to the back portion 114, and is set in slightly to form a flange 119 around the edges for proper positioning of the cover. In this embodiment, the arcuate film guide member 120 is rigidly mounted throughout its entire arc in spaced relationship to the back portion 114, and positioned to penetrate the space between the flanges of a reel along an upper portion of the reel. Again, the film guide member 120 cannot penetrate between the flanges along the entire periphery of the reel 12 since this would prevent film from being withdrawn from the reel 12. Mounted adjacent to and perpendicular to the back portion 14 is a circular reel positioner abutment 122, which aids in properly positioning the reel within the receptacle 110. The function of this positioner abutment 122 is simply to maintain the reel in proper position when the cover is placed on the receptacle 110, and it should be understood that the rotation of the reel 130 is preferably not guided by the positioner abutment 122.

As with the embodiment shown in FIGS. 1–12, the receptacle 110 has a rewind opening 124 in the side of the outer wall 118. In addition, the film guide member 120 does not form a complete circle, but leaves a gap 128 at the bottom of the reel receptacle 110, to permit film to be withdrawn from the assembled cartridge.

The manner in which a reel is inserted into the cartridge receptacle 110 is illustrated in FIG. 14, wherein the reel is designated by reference numeral 130. To insert the reel 130 into the receptacle 110, the reel 130 is simply tilted, and one flange is inserted underneath the film guide member 120. By inserting the flange under the end of the film guide member 120 adjacent to the gap 128, insertion of the reel 130 is a simple matter.

The inside of the cover, generally designated by reference numeral 132, is shown in FIG. 15. The design of the cover 132 is basically identical to the design of the cover 40 of the first embodiment previously described. The cover 132 has a flat face portion 134 and an outer wall 136 which is generally perpendicular to the flat face portion 134, and positioned to fit over the outer wall 118 of the reel receptacle 110. The cover 132 also has a rewind opening 138 and a gap 140 in the outer wall 136, to permit withdrawal of film from the fully assembled cartridge. The cover 132 has a reel-bearing projection 142 which projects from the flat face portion 134 a distance sufficient to engage the central aperture of a reel 130 positioned in the reel receptacle 110, and to form a bearing surface therefore. Surrounding the reel-bearing projection 142 is a concentric reel spacer ridge 144 which prevents the reel 130 from contacting the flat face portion 134, which would cause improper positioning as well as excessive friction.

In assembled relationship, the embodiment of FIGS. 13–15 appears similar to that shown in FIGS. 1–12. However, the embodiment shown in FIGS. 13–15 is intended for use with a larger size reel, so that the rewind aperture must be positioned relatively lower in order to be properly penetrated by the drive puck 94.

Figures 16, 17, 18:
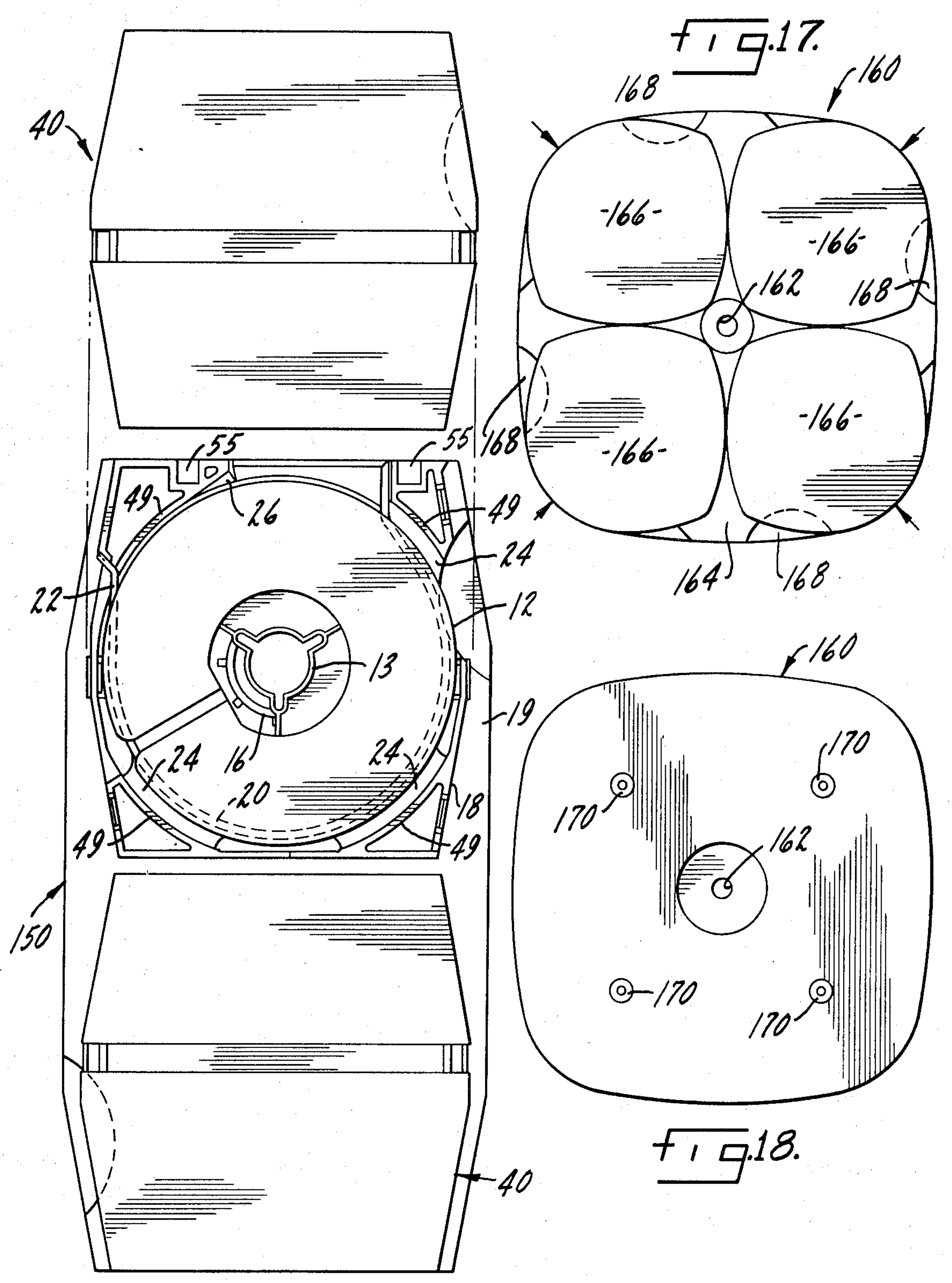
FIG. 16 is a front view of a dual-reel cartridge constructed in accordance with the present invention, shown with one of the covers removed.
FIG. 17 is a front view of a rotatable cartridge for a plurality of reels.
FIG. 18 is a back view of the cartridge shown in FIG. 17.

Referring to FIGS. 16–18, the cartridge of the present invention can be constructed in a manner to receive a plurality of reels. FIG. 16 illustrates a cartridge having a dual reel receptacle, indicated generally by reference numeral 150, and having a threading aperture (not shown) on each end. The reel receptacle 150 has a pair of covers 40. These covers 40 are identical to the cover 40 shown in FIGS. 5–8 with relation to the first embodiment. Of course, a single, unitary cover (not shown) could also be employed. In FIG. 16, one of the covers 40 has been removed to show a reel 12 in place, along with the interior detail of the reel receptacle 150. This interior detail is identical to that shown for the reel receptacle 10 of FIGS. 1–4, and like parts are designated by like reference numerals. Of course, the receptacle 150 could also be constructed with film guide members that are rigid throughout their entire arcs, and the interior detail would then be essentially identical to that shown in FIG. 13.

To use the embodiment of FIG. 16, the cartridge is simply inserted into the automatic feed-out module 82 in the manner shown in FIG. 11. After a reel of film from one cartridge has been shown, the film is rewound back onto the reel 12 with the drive puck 94 in the manner previously described. After the film has been rewound, the cartridge is removed and rotated 180 , so that the reel which was formerly on top is in the projection position.

FIGS. 17 and 18 show yet another embodiment, wherein four reels are employed. In this embodiment, the film cartridge is rotatable, and has a multiple reel receptacle, indicated by reference numeral 160. The reel receptacle 160 has a central spindle aperture 162 and a relatively flat back portion 164. The interior of the cartridge includes reel spacer ridges which are positioned at an equal distance from the spindle aperture 162, and at an equal distance from one another, along with arcuate film guide members, each being generally concentric with its associated reel spacer ridge, as in the embodiments previously described. That is, the film guide members may each have a flexible end portion, as shown in FIGS. 1 and 2, or the film guide members may each be rigid throughout its entire arc, as shown in FIG. 13. The covers, designated by reference numeral 166, are also of a similar design to those shown in the embodiments previously described. However, the receptacle 160 and covers 166 must be shaped to permit the cartridge to be rotated about the spindle opening 162 when mounted on a spindle, while permitting the delivery of film to an automatic feed-out module from any of the reels located in the receptacle. While a circular shape would be satisfactory, the shape shown in FIG. 17, wherein the corners are rounded, is equally suitable. In use, the film is withdrawn from the cartridges with the corners, indicated by the arrows, facing downwardly. The covers 166 and receptacle 160 have rewind openings 168, to permit each reel to be rewound while it is in projection position before the cartridge is rotated for projection of the next successive reel.

FIG. 18 shows a back view of the reel receptacle 160 shown in FIG. 17. The receptacle 160 preferably has a plurality of alignment recesses 170 which are positioned in equal distance from the spindle aperture 162, and are equally spaced around the back of the reel receptacle 160. The function of the alignment recesses is to engage suitable alignment means on a projector, such as a spring-loaded ball (not shown) to maintain the cartridge in its proper rotational position for projection of each reel. The number of alignment recesses 120 is equal to the number of reels that the cartridge is designed to contain.

In addition to the basic film cartridges previously described, the present invention also provides a method for estimating the number of feet in a strip of flexible material, such as film, or a reel, together with a scale for measuring the amount of film remaining on a reel, which scale may be incorporated into the cartridge of the present invention.

In carrying out the method, a beam of light is projected between the flanges of the reel in a manner so that the light beam is at least partially interrupted or masked in accordance with the amount of flexible material, such as film, on the reel. The beam is collected on a collection surface, and the collection surface is read to provide an estimate of the number of feet of film remaining on the reel.

Referring again to FIG. 7, in a preferred embodiment, the top end of the cartridge has a scale 190 on the cover 40, this scale being positioned for illumination by a beam of light from an external light source, the beam passing upwardly through the cartridge and between the flanges of the reel. In the most preferred embodiment, as shown in FIG. 7, the scale 190 is inclined downwardly toward the front of the cartridge. The scale 190 may be graduated in any manner desired, and will preferably be graduated to provide an estimate of the length of film remaining on the reel 12.

Referring to FIG. 11, in order for the scale 190 to function, it is necessary that the automatic feed-out module 82 incorporate a light source 192 which is positioned so that the passage of the light beam is at least partially masked by a strip of film on the reel 12. This is shown in FIG. 12, wherein the reel 12 and film 194 on the reel 12 are shown by phantom lines. As indicated by broken lines, a light beam 196 from the light source 192 passes upwardly through the cartridge and between the flanges of the reel 12, and is partially masked by the film 194 remaining on the reel 12. By reading the scale 190, an estimate of the amount of film 194 remaining on the reel 12 can be made.

Referring to FIG. 5 and FIG. 7, the underside of the scale 190 is preferably indented to form a generally horizontal light collection surface 198. While the scale 190 may simply employ a strip of semitransparent material, such as a "frosted"

portion of the cover 40 or a frosted piece of glass, in the preferred embodiment means will be provided for focusing the light and making the scale 190 easily readable. For example, a Fresnel lens may be placed on the underside of the scale 190 along the light collection surface 198. Alternatively, a plurality of focusing lenses may be placed on the light collection surface 198. Since the cover 40 will generally be made of plastic, which may be transparent, this Fresnel lens or focusing lenses may be simply molded onto the light collection surface 198. Other possibilities for improving the readability of the scale 190 include the use of a "light bar" of light-transmittent material molded into the cover 40, and a series of apertures along the scale 190 providing illuminated numbers indicating the amount of film 194 remaining on the reel 12.

Obviously, many modifications and variations of the invention as hereinbefore set forth may be made without departing from the spirit and scope thereof and it is intended to cover in the appended claims all such modifications and variations as fall within the true spirit and scope of the invention.

We claim:

1. A cartridge for a strip of flexible material on a reel, said cartridge being adapted for use in automatic feed-out means, comprising: a reel receptacle having a substantially planar back portion, a reel spacer ridge on said back portion, and an arcuate guide member spaced from said back portion and positioned to penetrate the space between the flanges of a reel along a portion of the circumference of said reel; and a cover adapted to fit over said reel receptacle to substantially enclose a reel in said receptacle, said cover having an internal reel spacer ridge and a central, internal reel-bearing projection located to penetrate the central opening in the hub of a reel positioned in said reel receptacle, said reel receptacle and said cover being so constructed and arranged to form a threading aperture on the bottom end of the assembled cartridge to permit a strip of flexible material to be drawn from said reel out of said cartridge.

2. The cartridge as defined in claim 1 wherein said reel receptacle and cover are constructed to form another opening in said cartridge to permit friction drive means to contact the rim of said reel.

3. The cartridge as defined in claim 2 further including a horizontal rib and a pair of mounting tabs projecting rearwardly from the exterior of said reel receptacle.

4. The cartridge as defined in claim 3 wherein the front of said cover has a groove and a pair of apertures positioned to receive said ribs and said tabs, respectively, to permit said cartridges to be stacked.

5. The cartridge as defined in claim 3 wherein said cartridge has a pair of mounting apertures in the bottom end thereof.

6. The cartridge as defined in claim 1 wherein said film guide member has a flexible end portion which is free to move to facilitate the positioning of a reel in said reel receptacle.

7. The cartridge as defined in claim 1 wherein said film guide is rigidly mounted on said reel receptacle throughout its entire arc.

8. The cartridge as defined in claim 1 wherein said reel receptacle is unitary and comprises a plurality of reel spacer ridges and arcuate guide members to accommodate a plurality of reels.

9. The cartridge as defined in claim 1 further including a scale on the top end of said cartridge, said scale positioned for illumination by a beam of light from an external light source passing upwardly through said cartridge and between the flanges of said reel, said light source being positioned so that the passage of said light beam is at least partially masked by a strip of flexible material on said reel.

10. The cartridge as defined in claim 9 wherein said scale is inclined downwardly toward the front of said cartridge.

11. The cartridge as defined in claim 10 further including a plurality of focusing lenses on the underside of said scale.

12. The cartridge as defined in claim 10 further including a Fresnel lens on the underside of said scale.

13. A film cartridge adapted for use in an automatic loading projector comprising: a reel receptacle having a flat back portion, a circular reel spacer ridge on said back portion, and an arcuate film guide member spaced from said back portion and positioned to penetrate the space between the flanges of a reel along an upper portion of said reel, said guide member being generally concentric with said reel spacer ridge and having a flexible end portion which is free to move to facilitate the positioning of a reel in said reel receptacle; a cover adapted to fit over said reel receptacle to substantially enclose a reel of film in said receptacle, said cover having a central, internal reel-bearing projection located to penetrate the central opening in the hub of a reel positioned in said reel receptacle and an internal reel spacer ridge which surrounds and is concentric with said reel-bearing projection, said reel receptacle and said cover being so constructed and arranged to form a threading aperture on the bottom of the assembled cartridge to permit a strip of film to be drawn from said reel out of said cartridge, and said receptacle and cover being so constructed and arranged to form a rewind opening on the side of said cartridge to permit a drive puck to contact the rim of said reel.

14. The film cartridge as defined in claim 13 further including a reel positioner abutment mounted on said reel receptacle and forming an abutment for the rim of a reel inserted into said receptacle to aid in positioning said reel.

15. The film cartridge as defined in claim 14 further including a pair of horizontal, parallel ribs and a pair of mounting tabs projecting rearwardly from the exterior of said reel receptacle.

16. The film cartridge as defined in claim 15 wherein the front of said cover has a groove and a pair of apertures positioned to receive said ribs and said tabs, respectively, to permit said cartridges to be stacked.

17. The film cartridge as defined in claim 15 wherein said cartridge has a pair of mounting apertures in the bottom end thereof.

18. The film cartridge as defined in claim 13 further including a scale on the top end of said cartridge, said scale positioned for illumination by a beam of light from an external light source passing upwardly through said cartridge and between the flanges of said reel, said light source being positioned so that the passage of said light beam is at least partially masked by film on said reel.

19. The film cartridge as defined in claim 18 wherein said scale is inclined downwardly toward the front of said cartridge.

20. A film cartridge adapted for use in an automatic loading projector comprising: a reel receptacle having a flat back portion, a circular reel spacer ridge on said back portion, and an arcuate film guide member spaced from said back portion and positioned to penetrate the space between the flanges of a reel along an upper portion of said reel, said guide member being generally concentric with said reel spacer ridge and being rigidly mounted on said reel receptacle throughout its entire arc; and a cover adapted to fit over said reel receptacle to substantially enclose a reel of film in said receptacle, said cover having a central, internal reel-bearing projection located to penetrate the central opening in the hub of a reel positioned in said reel receptacle, and an internal spacer which surrounds and is concentric with said reel-bearing projection, said reel receptacle and said cover being so constructed and arranged to form a threading aperture on the bottom of the assembled cartridge to permit a strip of film to be drawn from said reel, and said receptacle and cover being so constructed and arranged to form a rewind opening on the side of said cartridge to permit a drive puck to contact the rim of said reel.

21. The film cartridge as defined in claim 20 further including a reel positioning guide mounted on said reel receptacle and forming an abutment for the rim of a reel inserted into said receptacle to aid in positioning said reel.

22. The film cartridge as defined in claim 21 further including a pair of horizontal, parallel ribs and a pair of mounting tabs projecting rearwardly from the exterior of said reel receptacle.

23. The film cartridge as defined in claim 22 wherein the front of said cover has a groove and a pair of apertures positioned to receive said ribs and said tabs, respectively, to permit said cartridges to be stacked.

24. The film cartridge as defined in claim 22 wherein said cartridge has a pair of mounting apertures in the bottom end thereof.

25. The film cartridge as defined in claim 20 further including a scale on the top end of said cartridge, said scale positioned for illumination by a beam of light from an external light source passing upwardly through said cartridge and between the flanges of said reel, said light source being positioned so that the passage of said light beam is at least partially masked by a strip of film on said reel.

26. The film cartridge as defined in claim 25 wherein said scale is inclined downwardly toward the front of said cartridge.

27. A dual reel film cartridge adapted for use in an automatic loading projector comprising: a dual reel receptacle unit having a flat back portion, a pair of circular reel spacer ridges on said back portion, and a pair of oppositely disposed, generally arcuate film guide members spaced from said back portion and positioned to penetrate the space between the flanges of a reel along an upper portion of the circumference of said reel, said guide members each being generally concentric with one of said reel spacer ridges; and a pair of covers adapted to fit over said reel receptacle, each cover being adapted to substantially enclose a reel of film in said receptacle, and said covers each having a central, internal reel-bearing projection located to penetrate the central opening in the hub of a reel positioned in said reel receptacle and an internal reel spacer ridge surrounding said hub, said reel receptacles and said covers being so constructed and arranged to form a threading aperture on each end of the assembled cartridge to permit film to be drawn from said reel, and to permit said cartridge to be rotated 180° to selectively draw film from either of said reels.

28. The film cartridge as defined in claim 27 wherein said reel receptacle and said covers are constructed to form a rewind opening on each side of said cartridge to permit a drive to contact the rim of either reel of film in said receptacle.

29. The film cartridge as defined in claim 27 wherein said film guide members each have a flexible end portion which is free to move to facilitate the positioning of reels in said reel receptacle.

30. The film cartridge as defined in claim 27 wherein said film guides are rigidly mounted on said reel receptacle throughout the entire arc of each film guide.

31. A rotatable film cartridge for a plurality of reels, said cartridge being adapted for use in an automatic loading projector comprising: a multiple reel receptacle unit having a central spindle aperture and a relatively flat back portion, said back portion having a plurality of reel spacer ridges positioned at an equal distance from said spindle aperture, and at an equal distance from one another, and a generally arcuate film guide member adjacent to each of said reel spacer ridges, said film guide members being spaced from said back portion and positioned to penetrate the space between the flanges of a reel along an upper portion of said reel, and said film guide members each being generally concentric with its associated reel spacer ridge; and a cover for each of said reel spacer ridges and film guide members, each cover being adapted to substantially enclose a reel of film in said receptacle, and said covers each having a central, internal reel-bearing projection located to penetrate the central opening in the hub of a reel positioned in said receptacle, said reel receptacle and said cover being so constructed and arranged to form a threading aperture at the edge of said receptacle adjacent to each film guide to permit film to be drawn from said receptacle, and said receptacle and covers being shaped to permit said cartridge to be rotated about said spindle opening and to permit delivery of film to an automatic feed-out module from any of the reels located in said receptacle.

32. The film cartridge as defined in claim 31 further including a plurality of alignment recesses on the back of said cartridge, said recesses being positioned in equal distance from said spindle aperture and being equally spaced from one another, and said recesses being equal in number to the number of reels that said cartridge is designed to contain.

33. The film cartridge as defined in claim 31 wherein said reel receptacle and said covers are constructed to form a rewind opening on each side of said cartridge for each reel of film, to permit a drive puck to contact the rim of said reel when said reel is in projection position.

34. The film cartridge as defined in claim 31 wherein said film guide members each has a flexible end portion which is free to move to facilitate the positioning of reels in said reel receptacle.

35. The film cartridge as defined in claim 31 wherein said film guides are rigidly mounted on said reel receptacle throughout the entire arc of each film guide.

* * * * *

UNITED STATES PATENT OFFICE

CERTIFICATE OF CORRECTION

Patent No. 3,628,753 Dated December 21, 1971

Inventor(s) Gordon E. Bradt
Richard Frystak; Nicholas Mischenko; Edward R. Prelletz It is certified that error appears in the above-identified patent and that said Letters Patent are hereby corrected as shown below:

Column 5, line 70, " 180 " should be --180°--.

Column 6, line 39, " or " should be --on--.

Signed and sealed this 30th day of May 1972.

(SEAL)
Attest:

EDWARD M.FLETCHER,JR.
Attesting Officer

ROBERT GOTTSCHALK
Commissioner of Patents